Dec. 9, 1941.   G. C. STODDARD   2,265,676
PROCESS FOR PREVENTING CONTAMINATION OF FRACTIONALLY
DISPENSED BOTTLED LIQUIDS
Filed April 6, 1939
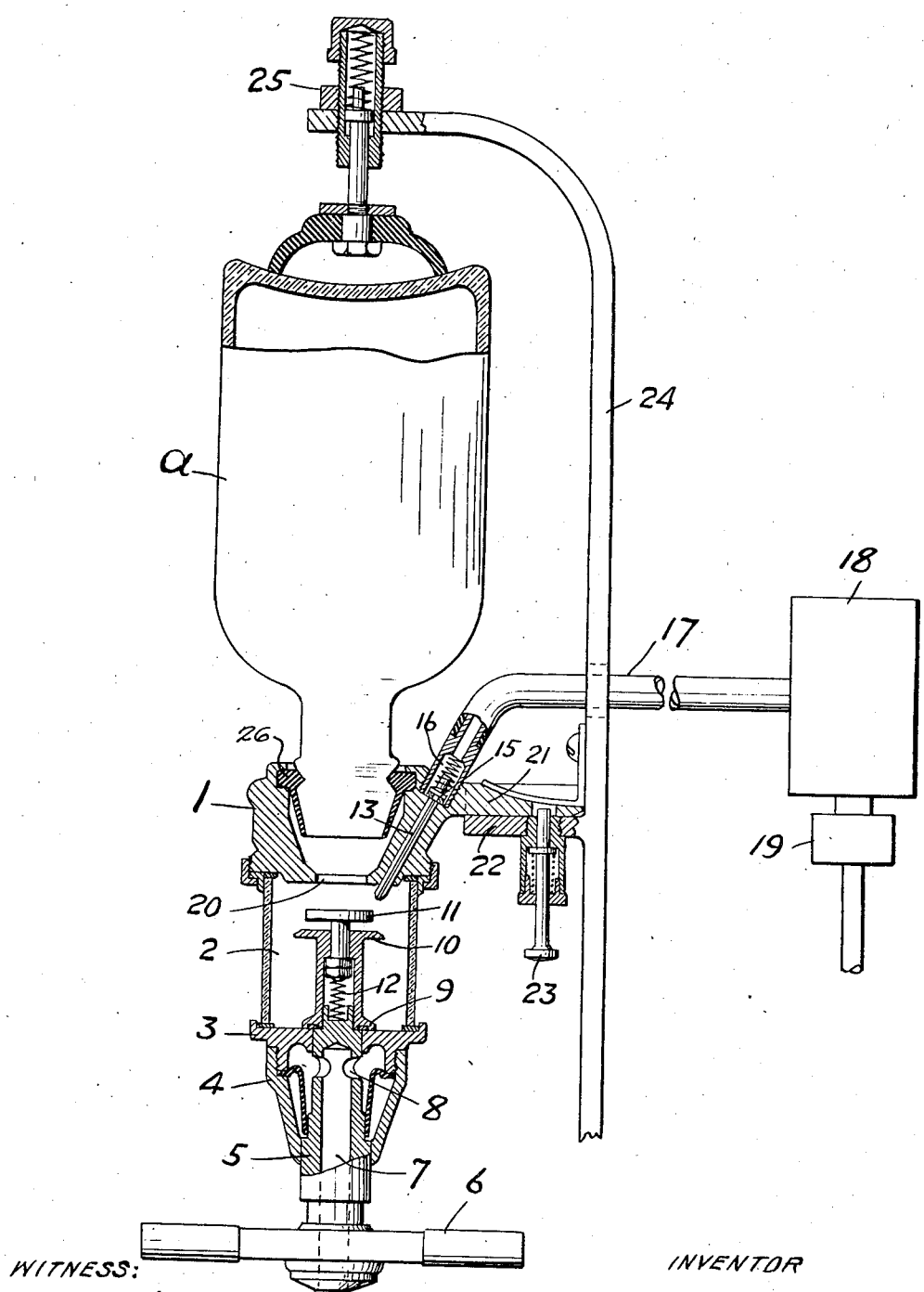
WITNESS:
INVENTOR
George C. Stoddard
BY
ATTORNEYS.

Patented Dec. 9, 1941

2,265,676

UNITED STATES PATENT OFFICE 2,265,676

PROCESS FOR PREVENTING CONTAMINATION OF FRACTIONALLY DISPENSED BOTTLED LIQUIDS

George C. Stoddard, Scarsdale, N. Y., assignor to The De Laval Separator Company, New York, N. Y., a corporation of New Jersey Application April 6, 1939, Serial No. 266,255

5 Claims. (Cl. 226—93)

It is well known that many bottled beverages cannot be sold by the glass, for the reason that, as soon as the cork is withdrawn and the beverage exposed to the air, the bacteria carried by the air begin to contaminate the beverage; that is, actions are started which cause the liquid, within a short time, to seriously deteriorate in quality and particularly in taste. Immediate recorking of the bottle is ineffective to arrest this deterioration, since air has replaced the space created by the part of the liquid withdrawn. Among beverages which it is well known cannot be dispensed in successive fractional quantities are dry wines, which are peculiarly susceptible to rapid deterioration by contact with the atmosphere, but the same action occurs, although to a lesser extent, with sweet or fortified wines. Scarcely any beverage is wholly unaffected by prolonged contact with the atmosphere.

The object of my invention is to enable any bottled liquid to be dispensed in successive fractional quantities and at the same time prevent contact of the liquid remaining in the bottle or other supply vessel from contacting with atmospheric air.

In carrying out my invention I first, after uncorking the bottle, place it in communication with a chamber which may contain air but which is closed from communication with the outside atmosphere. I then close communication between said chamber and the bottle and displace the air in the chamber with a gas of such character that contact of the bottled liquid therewith will have no taste-impairing or other quality-deteriorating effect upon the liquid. I then open communication between the bottle and the chamber and cause the gas to largely or wholly displace the air in the small space of the bottle not occupied by liquid, or at least effect such admixture of gas and air that the gas will constitute the greatly predominating constituent of the gaseous mixture. This operation may be repeated as often as desired; a fresh charge of gas in each operation displacing the gas-air mixture in the chamber. It is clear that after a very few operations the percentage of air in the gas will be almost negligible. If the gas is substantially heavier than the air and does not readily mix therewith, the complete removal of the air may be facilitated by gravity displacement. Thereafter, a part of the contents of the bottle or other container is allowed to flow into the chamber, while the gas contained in the chamber will flow into the bottle and fill the space formerly occupied by the liquid therein. The liquid in the chamber is then allowed to flow out into a glass or other ultimate receptacle, during which communication between the chamber and the bottle is cut off and the chamber is filled with gas as the liquid outflows therefrom. Communication between the chamber and the atmosphere is then closed and communication between the chamber and the bottle is reopened and another exchange of liquid and gas between the bottle and chamber takes place.

The operation of the process does not depend upon the employment of any particular mechanism, but I have found it possible to practice the process by taking a known device for delivering measured quantities of liquid and so connecting it with a source of gas and so manipulating it preparatory to use as a dispenser as to successfully carry out the process hereinbefore described. A preferred apparatus of this type is shown in sectional elevation in the appended drawing.

The apparatus comprises an open-ended housing 1, a measuring chamber 2 having at one end a central opening 20 communicating with the housing 1 and at the other end being closed by a housing 3, 4, having a central opening within which is reciprocable a valve stem 5 carrying at its outer end a cross bar 6 and provided with an axial channel 7 having at its inner end ports 8. Within chamber 2 is a valve member 9 threaded on the stem 5 and carrying a disc 10. Member 9 has a central bore within which extends the stem of a valve 11, which is normally held in the position shown by a spring 12 in said bore, but which is adapted to be moved, by axial movement of the valve stem 5, to seat against and close the opening between housing 1 and measuring chamber 2. A stem 13, slidable in the housing 1, projects into the measuring chamber 2 and is adapted to be actuated by the disc 10 in said axial movement of the stem 5. The stem 13 is grooved or fluted to form passages communicating with a valve chamber 16 communicating with one end of a tube 17. A spring-pressed valve 15 normally maintains the stem 13 in the position shown in the drawing and closes communication between the passages in the stem and the tube 17. The other end of tube 17 communicates with a low pressure gas tank 18, which is kept filled, through a pressure reducing valve 19, from a high pressure gas tank (not shown). The tube 17 is flexible and of a length permitting all needed manipulation of the bottle and the described measuring device.

In operation, as soon as the cork is removed from the bottle a it is placed in an upright position and the measuring device, which is inverted from the position shown in the drawing, is pressed down on the neck of the bottle, the gasket 26 making a tight joint. Pressure on the cross bar 6 forces the hollow stem 5 downward, which seats valve 11 and causes disc 10 to engage stem 13 and move it to open valve 15 and allow gas to flow through the chamber 2 and expel the air therefrom through the ports 8, which, in the said movement of the stem 5, are now in position to connect the chamber 2 with the channel 7 and thence with the atmosphere. Pressure is now removed from the cross bar 6 and the stem 5 rises, unseating valve 11 and allowing the gas in chamber 2 to mingle with and largely displace the air in the space in the bottle above the beverage. If the gas used is heavier than air, for example, carbon dioxide, its displacement of the aid from the bottle will be facilitated. By repeating this operation several times the displacement of the air by gas will be almost complete.

The bottle and measuring device are now inverted to the position shown in the drawing and a tongue 21 carried by the housing 1 is slipped into a groove on an arm 22 of a standard 24 and locked by a spring pressed plunger 23.

The bottle may be retained in the position shown by a suitable clamping device 25 carried on the end of the standard and engaging the bottom of the bottle.

Thereafter the operation is that of any typical device for delivering measured quantities of liquid, except that withdrawn liquid is displaced by gas instead of by air. That is, as soon as the measuring device and bottle occupy the position shown, liquid flows from the bottle into the chamber 2, while gas flows from the chamber 2, to the top of the bottle. When a measured quantity of liquid is to be delivered to a receptacle, such as a drinking glass, the latter is pressed up against the cross bar 6, thereby pushing up the stem 5, unseating valve member 9, but no liquid flows out until the part of the stem 5 immediately below the valve member 9 moves up a distance sufficient to open the ports 8 and channel 7 to the chamber 2, by which time valve 11 has seated to close communication between the bottle and chamber 2. About coincidentally with the opening of the chamber 2 to the channel 9, disc 10 pushes up stem 13 and opens valve 15, and gas from the tank 18 flows into the chamber 2 and drives out therefrom the measured quantity of liquid therein. Upon the removal of the filled receptacle, the stem 5 returns to its normal position, closing valves 9 and 15 and unseating valve 11 to allow another exchange of liquid and gas between the bottle and the chamber.

What I claim and desire to protect by Letters Patent is:

1. The process of delivering successive fractional portions of a liquid from a supply container having a single end opening to a receptacle while avoiding contamination of the remaining liquid by atmospheric air, which comprises placing said liquid-holding container in position to afford communication between its said end opening and an air-containing space, displacing the air in said space with a gas inert and sterile to the liquid, shutting off commuinication between said space and the gas supply, allowing reverse flow of liquid and gas through said opening until said space is filled with liquid, thereby forming a gas pocket in the closed end of the supply container, then closing communication between said space and the end opening in the container, opening communication between said space and said source of gas and opening communication between said space and said receptacle, thereby allowing discharge of liquid from said chamber to said receptacle and the displacement by said gas of the discharged liquid, then closing communication between said space and said receptacle and between said space and the source of gas supply and opening communication between the opening in the container and said space to again allow reverse flow of liquid and gas through said opening until said space is again filled with liquid.

2. The process of delivering successive fractional portions of a liquid from a supply container having a single end opening to a receptacle while avoiding contamination of the remaining liquid by atmospheric air, which comprises placing said liquid-holding container in position to afford communication between its said end opening and an air-containing space, displacing the air in said space with a gas inert and sterile to the liquid, shutting off communication between said space and the gas suppply, allowing reverse flow of liquid and gas through said opening until said space is filled with liquid, thereby forming a gas pocket in the closed end of the supply container, then placing the receptacle to be filled, while open to the atmosphere, beneath said space, closing communication between said space and the opening in the container, opening communication between said space and a source of said gas and opening said space to the atmosphere below the liquid contained in said space and above the receptacle to allow said liquid to flow from said space through the atmosphere into said receptacle and cause gas to displace the liquid as it outflows from said space, then closing the opening from said space to the atmosphere through which said liquid has discharged, closing communication between said space and the source of gas supply and opening communication between the opening in the container and said space to again allow reverse flow of liquid and gas through said opening until said space is again filled with liquid.

3. The process of delivering successive fractional portions of a liquid from a supply container having a single end opening to a receptacle while avoiding contamination of the remaining liquid by atmospheric air, which comprises placing said container below a chamber having an opening to the atmosphere and thus containing air and in such position as to afford communication between said openings and seal both the container and said chamber from the atmosphere while preventing flow of liquid into said chamber, displacing the air in the chamber with a gas inert and sterile to the liquid, turning said chamber and container into position to allow gravity flow of liquid through said connected openings into said chamber and reverse flow of gas through the same openings into the closed end of said container, opening communication between said chamber and the source of said gas and opening communication between said chamber and said receptacle, thereby allowing discharge of liquid from said chamber to said receptacle and the displacement by said gas of the discharged liquid, then closing communication between said chamber and said receptacle and between said chamber and the source of gas supply and opening communication through said registering openings to again allow reverse flow of liquid and gas through said registering openings until said space is again filled with liquid.

4. The process of delivering successive fractional portions of a liquid from a supply container having a single end opening and a receptacle open to the atmosphere while avoiding contamination of the remaining liquid by atmospheric air, which comprises placing a chamber having an opening to the atmosphere in such position that said opening faces downward, placing said container with its end opening upward and connecting said openings so as to seal both said openings from the atmosphere, displacing the air in the chamber with a gas inert and sterile to the liquid, inverting the chamber and container to thereby allow gravity flow of liquid through said connected openings and reverse flow of gas through the same openings into said container, then placing the receptacle to be filled, while open to the atmosphere, beneath said chamber, closing communication through the connected openings between said chamber and container, opening communication between said chamber and the source of said gas and opening said chamber to the atmosphere below the liquid contained in said chamber and above the receptacle to allow said liquid to flow from said chamber through the atmosphere into said receptacle and cause gas to displace the liquid as it so discharges and resist admission of air to said chamber during said discharge of liquid into said receptacle and after said discharge is completed, then closing the opening from said chamber to the atmosphere through which liquid has so discharged, closing communication between said chamber and the source of gas supply and opening communication between the connected openings in said container and in said chamber to again allow reverse flow of liquid and gas through said connected openings.

5. The process of delivering fractional portions of a liquid from a bottle or like container having a single opening at one end to a receptacle while avoiding contamination of the liquid by atmospheric air, which comprises placing said liquid-holding container in position to afford communication between its end opening and an air-containing space, displacing the air in said space with a gas inert and sterile to the liquid, shutting off the supply of gas to said space, allowing reverse flow of liquid and gas through said opening to thereby fill said space with liquid and form a gas pocket in the closed end of the supply container, and subsequently closing said opening while simultaneously discharging liquid from said space into a receptacle open to the atmosphere while replacing the discharged liquid with gas followed by shutting off discharge of liquid from, and supply of gas to, said space and allowing reverse flow of liquid and gas through said opening until said space is again filled with liquid and the size of the gas pocket in the closed end of the supply container correspondingly enlarged.

GEORGE C. STODDARD.